US009557402B2

(12) United States Patent
Bartov et al.

(10) Patent No.: US 9,557,402 B2
(45) Date of Patent: Jan. 31, 2017

(54) INDOOR POSITIONING SYSTEM

(71) Applicant: Rosemount Inc., Chanhassen, MN (US)

(72) Inventors: Avishai Bartov, Hod-Hasharon (IL); Yossi Zlotnick, Ramat-Hasharon (IL)

(73) Assignee: Rosemount Inc., Chanhassen, MN (US)

( * ) Notice: Subject to any disclaimer, the term of this patent is extended or adjusted under 35 U.S.C. 154(b) by 8 days.

(21) Appl. No.: 14/493,730

(22) Filed: Sep. 23, 2014

(65) Prior Publication Data
US 2015/0247916 A1 Sep. 3, 2015

Related U.S. Application Data

(60) Provisional application No. 61/946,987, filed on Mar. 3, 2014.

(51) Int. Cl.
| | |
|---|---|
| *G01S 5/02* | (2010.01) |
| *G01S 5/30* | (2006.01) |
| *G01S 11/16* | (2006.01) |
| *G01C 21/20* | (2006.01) |
| *H04W 56/00* | (2009.01) |

(52) U.S. Cl.
CPC ............. *G01S 5/0257* (2013.01); *G01S 5/30* (2013.01); *G01S 11/16* (2013.01); *H04W 56/001* (2013.01); *G01C 21/206* (2013.01)

(58) Field of Classification Search
CPC .. H04M 2250/12; H04W 88/02; H04W 88/06; H04W 88/08; H04W 64/00; H04W 4/02; H04B 1/005; G01S 15/66; G01S 2015/465; G01S 1/02; G01S 1/022; G01S 1/024; G01S 1/04; G01S 1/042; G01S 1/045; G01S 1/24; G01S 1/72; G01S 1/725

See application file for complete search history.

(56) References Cited

U.S. PATENT DOCUMENTS

| | | |
|---|---|---|
| 5,491,670 A | 2/1996 | Weber |
| 6,292,106 B1 | 9/2001 | Solinsky et al. |
| 8,766,794 B2 | 7/2014 | Ferguson et al. |

(Continued)

FOREIGN PATENT DOCUMENTS

| | | |
|---|---|---|
| WO | WO 01/73710 | 10/2001 |
| WO | WO 2008/065691 | 6/2008 |

OTHER PUBLICATIONS

"The Cricket Location-Support System", by Nissanka Priyantha et al., Proceedings of the 6th Annual International Conference on Mobile Computing and Networking, Aug. 2000.

(Continued)

*Primary Examiner* — George Eng
*Assistant Examiner* — Umair Ahsan
(74) *Attorney, Agent, or Firm* — Westman, Champlin & Koehler, P.A.

(57) ABSTRACT

An indoor position system, includes a plurality of anchor stations each configured to transmit a radio frequency signal and an acoustic signal. A mobile station includes a radio frequency receiver configured to receive a radio frequency signal from at least one of the plurality of anchor stations and an acoustic receiver configured to receive an acoustic signal from at least one of the plurality of anchor stations. A processing unit is configured to determine position information of the mobile unit based upon the received radio frequency signal and acoustic signal.

24 Claims, 6 Drawing Sheets

(56) References Cited

U.S. PATENT DOCUMENTS

| | | | |
|---|---|---|---|
| 8,811,199 B2 | 8/2014 | Nixon et al. | |
| 2009/0070797 A1* | 3/2009 | Ramaswamy | H04L 12/66 725/10 |
| 2009/0295639 A1* | 12/2009 | Zhao | G01S 11/16 342/387 |
| 2010/0290359 A1 | 11/2010 | Dewey et al. | |
| 2011/0110242 A1* | 5/2011 | Nixon | H04W 64/00 370/252 |
| 2013/0050080 A1* | 2/2013 | Dahl | G01S 5/18 345/158 |
| 2015/0234033 A1* | 8/2015 | Jamieson | G01S 5/04 455/456.1 |
| 2015/0268327 A1* | 9/2015 | Neukirch | G01S 1/802 367/197 |

OTHER PUBLICATIONS

"An Advertising Supplement to Control Wired & Wireless HART Communication", Putman Media, Sep. 2013.
Invitation to Pay Additional Fees and, Where Applicable, Protest Fee and Partial International Search, from PCT/US2015/017720, dated Jun. 9, 2015.
Notification of Transmittal of the International Search Report and the Written Opinion of the International Searching Authority from PCT/US2015/017720, dated Oct. 7, 2015.

\* cited by examiner

INDOOR POSITIONING SYSTEM

CROSS-REFERENCE TO RELATED APPLICATION

The present application is based on and claims the benefit of U.S. provisional patent application Ser. No. 61/946,987, filed Mar. 3, 2014, the content of which is hereby incorporated by reference in its entirety.

BACKGROUND

The present invention relates to positioning systems. More specifically, the present invention relates to systems used to identify the locations of or track objects in a given area.

An Indoor Positioning System (IPS) is a network of devices used to wirelessly locate objects or people inside a building or within dense industrial areas. A special design is required since global positioning system (GPS) systems are typically not suitable to establish indoor locations as they require an unobstructed line of sight to four or more GPS satellites. Microwaves will be attenuated and scattered by roofs, walls and other objects and multiple reflections at surfaces cause multipath propagation serving for uncontrollable errors.

Time of flight (ToF) is the amount of time a signal takes to propagate from transmitter to receiver. Because the signal propagation rate is constant and known, the travel time of a signal can be used directly to calculate distance. Multiple (in GPS at least four satellites) measurements vs. multiple anchor stations can be combined with trilateration to find a location.

As speed of light is $3 \times 10^8$ m/sec, in radio frequency (RF) based systems, inaccuracy in clock synchronization is a key factor of the positioning error. In GPS, ToF generally requires a complicated synchronization mechanism to maintain a reliable source of time for sensors.

In addition, the accuracy of the ToF based methods often suffer from large multipath conditions in indoor localization, which is caused by the reflection and diffraction of the RF signal from objects.

Due to the attenuation and reflections caused by construction materials, it is desirable to have an unobstructed line of sight to at least three anchor points at any location that should be covered by the system. As a result, a larger number of anchor stations are required.

SUMMARY

An indoor position system, includes a plurality of anchor stations each configured to transmit a radio frequency signal and an acoustic signal. A mobile station includes a radio frequency receiver configured to receive a radio frequency signal from at least one of the plurality of anchor stations and an acoustic receiver configured to receive an acoustic signal from at least one of the plurality of anchor stations. A processing unit is configured to determine position information of the mobile unit based upon the received radio frequency signal and acoustic signal.

This Summary and the Abstract are provided to introduce a selection of concepts in a simplified form that are further described below in the Detailed Description. The Summary and the Abstract are not intended to identify key features or essential features of the claimed subject matter, nor are they intended to be used as an aid in determining the scope of the claimed subject matter.

DETAILED DESCRIPTION OF ILLUSTRATIVE EMBODIMENTS

In various aspects, the embodiments of the disclosure address the challenges of an Indoor Positioning System (IPS) by using a hybrid RF/acoustic approach, where in one embodiment the acoustic approach is ultrasonic. This includes addressing time synchronization and multipath issues. More specifically, electromagnetic waves are faster than sound by a factor of $10^6$. The RF pulse can be used as a synchronization pulse since relative to ToF of the ultrasonic pulse the ToF of the RF pulse is negligible. On the receiver side, multipath is the convolution of several pulses (pulse train) shifted in time (or equivalently, shifted in range). Assuming line of sight, the receiver will lock on the (fastest) first pulse.

The range resolution of the pulse determines the receiver ability to resolve two successive pulses. The typical dimensions of the physical construction determine the required range resolution. For corridors in industrial areas, the required range resolution should be less than one meter.

It is significantly easier to achieve the required range resolution with an acoustic rather than electromagnetic pulse. The achievable range resolution is bounded by the bandwidth and group velocity of the pulse. For an RF signal with the typical bandwidth of a wireless industrial network such as WirelessHART®, the range resolution is on the order of eighty meters. Using acoustics, the range resolution of an ultrasonic pulse with bandwidth of 1 kHz is less than 50 cm. In addition, in acoustics, the generation and sampling of advanced pulses can be done with conventional, low cost electronics.

Figure 1:
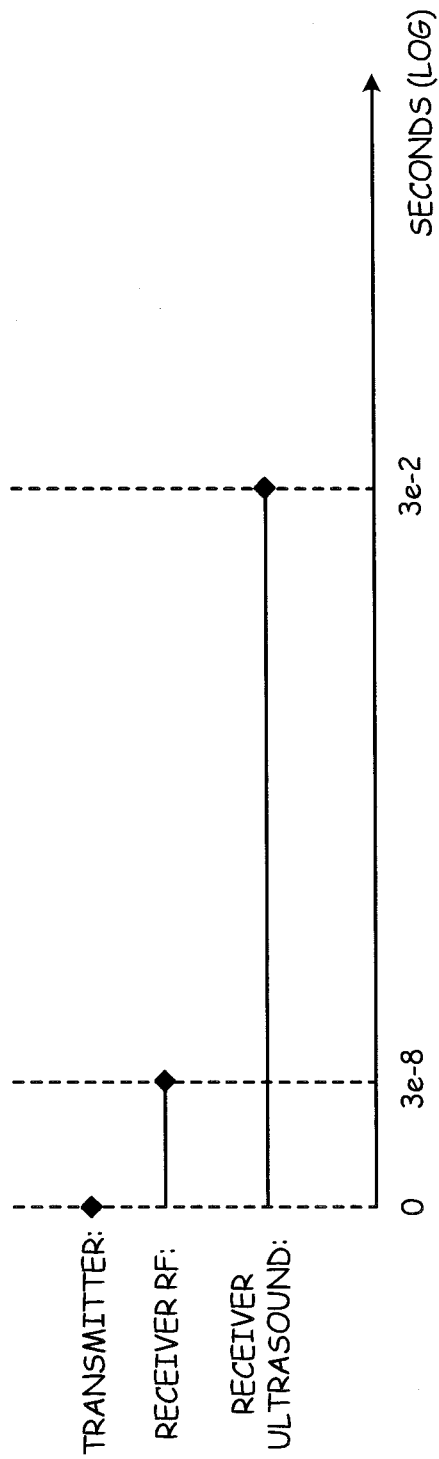
FIG. 1 is a graph illustration of time synchronization using an RF pulse in a positioning system.

FIG. 1 is a graph illustrating time synchronization using an RF pulse and an acoustic pulse in a positioning system. The acoustic pulse in one embodiment is an ultrasonic pulse. A transmitter or transmitters (described further below) transmit an RF pulse and an ultrasonic pulse simultaneously. Co-located receivers for RF and ultrasonic pulses receive the RF and acoustic pulses at time $3 \times 10^{-8}$ seconds for the RF pulse and $3 \times 10^{-2}$ seconds for the ultrasonic pulse. The difference in time of receipt is used in one embodiment to determine the distance the transmitter is from the co-located receivers, and is further described below.

Figure 2:
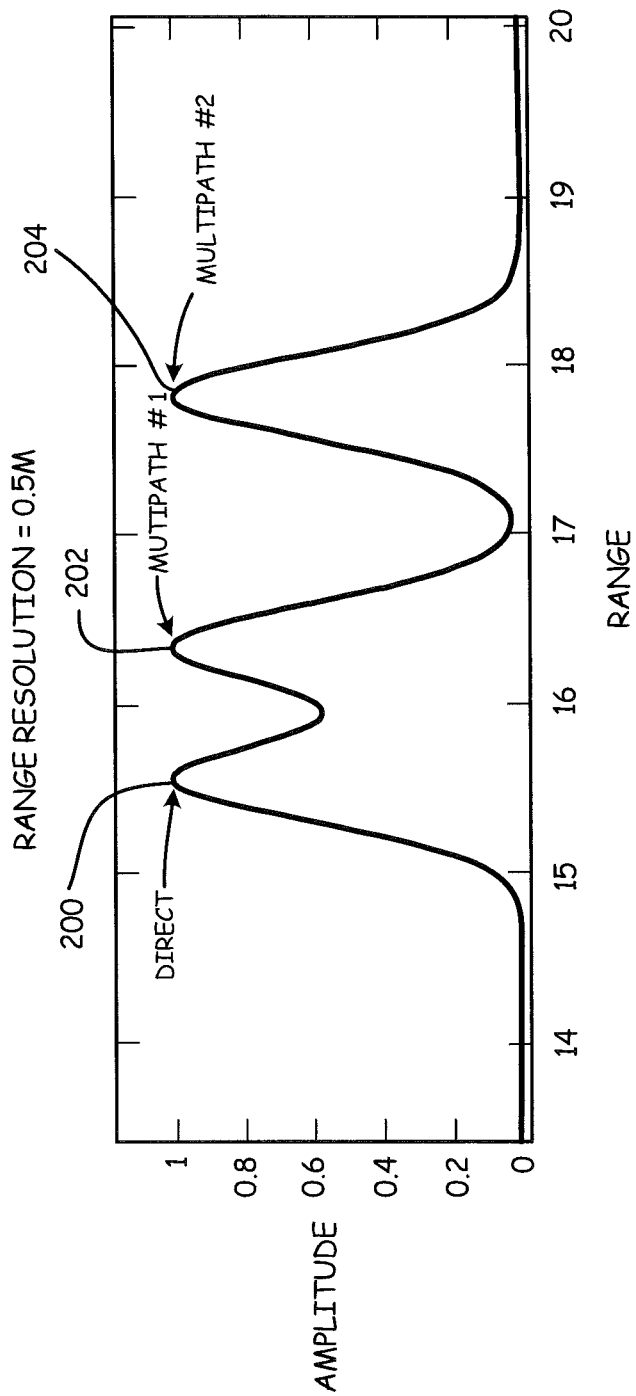
FIG. 2 is a graph of amplitude versus range illustrating a direct echo and a multipath reflection.

FIG. 2. is a graph of amplitude versus range illustrating a direct echo and a multipath reflection for a received acoustic pulse. As acoustic pulses may be reflected, scattered, or blocked entirely for some instances. A receiver in a direct line of sight of a transmitter will receive the most direct pulse first. Reflected pulses will be received at a later time. Referring to FIG. 2, a plot of signal amplitude of an ultrasonic signal received at an ultrasonic microphone is plotted versus distance determined in a manner as described further below. A first peak is shown at 200, and second and third peaks are shown at 202 and 204, respectively. With line of sight, the peak 200 shows the direct path distance from the transmitter to the microphone. The second and third peaks are multipath peaks, that is, signals received after reflection from one or more objects, indicated by increased time of flight, and hence, increased distance. With a line of sight between the transmitter and microphone, the shortest time of flight will be the direct straight line distance between the transmitter and microphone.

Figure 3:
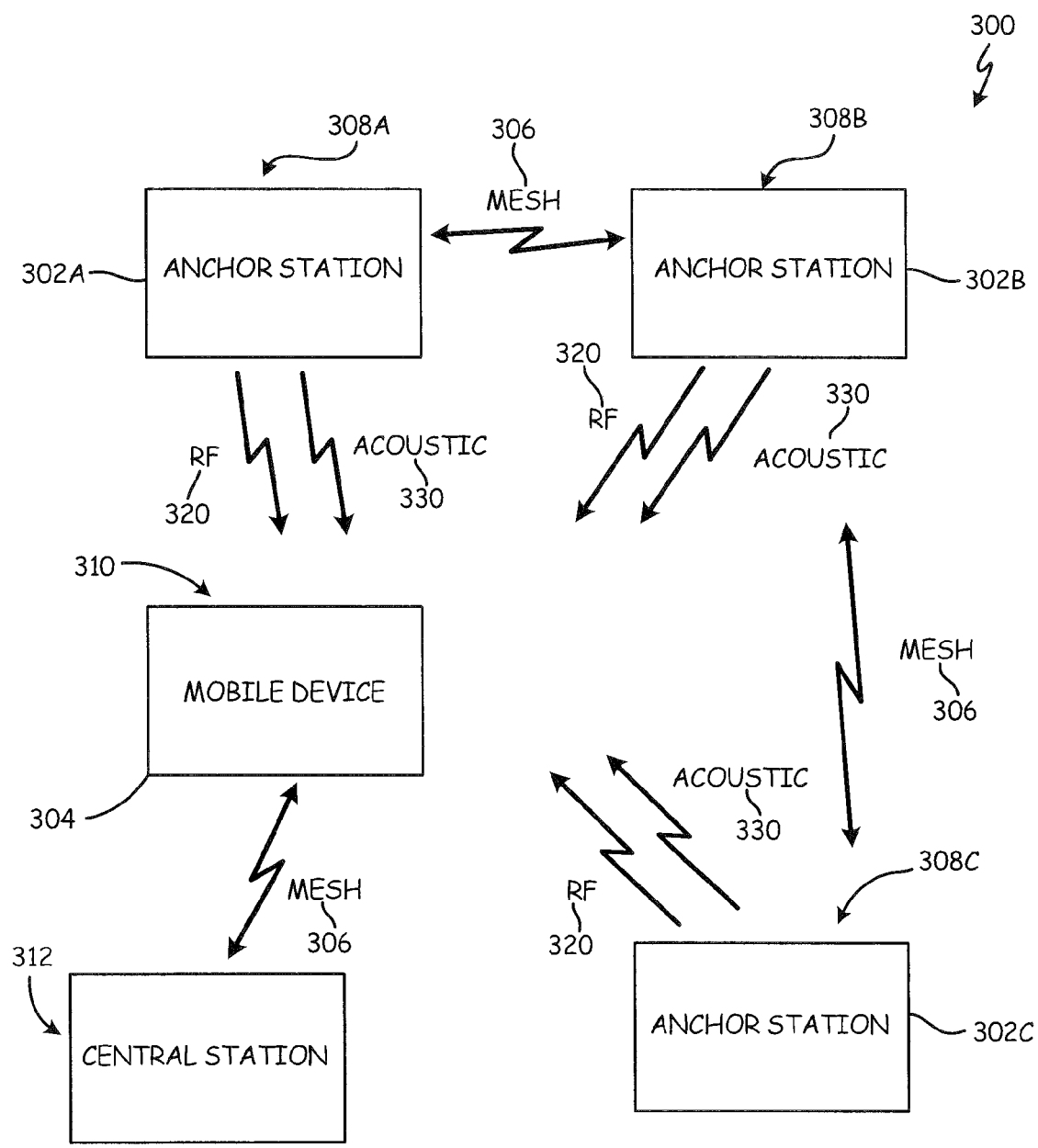
FIG. 3 shows a block diagram of a positioning system in accordance with one embodiment of the present disclosure.

In one specific configuration, the system is based on a commercially proved industrial mesh network such as WirelessHART® network, and is shown in block diagram form in FIG. 3.

FIG. 3 shows a system 300 having plurality of anchor stations 302 (three anchor stations 302A, 302B, and 302C shown in FIG. 3, and described in greater detail below) which are disposed in known positions, and a mobile station 304 (described in greater detail below) for which a position 310 is desired to be determined. Anchor stations 302 are in one embodiment part of a wireless network mesh 306 such as a WirelessHART® network. In operation, the plurality of anchor stations 302 are positioned at known locations 308A, 308B, and 308C around an area to be monitored. A mobile station 304 is located on or in close proximity to an object for which the position 310 is desired to be known. The object may be, by way of example only and not by way of limitation, a piece of inventory or a person.

To determine a distance from an anchor station 302 to the mobile station 304, the anchor station 302 transmits an RF message 320 (i.e., a WirelessHART® message) and an acoustic pulse 330 at substantially the same time. WirelessHART® signals allow for synchronization as they may contain synchronization information, and allow for transmission of data as well as is known in the art. Using this synchronization and data transmission capability allows the RF pulse to be used as a unique synchronization pulse, so that the mobile station 304 knows which anchor station 302 is transmitting in addition to when the transmission is made. The time difference between receipt of the RF pulse and receipt of the acoustic pulse at the mobile station 304 allows for a determination of the distance between the mobile station and the transmitting anchor station 302. A location for the mobile station may be determined using distance calculations from three separate anchor stations, for example using trilateration.

TDMA is a known standard for sharing a frequency channel on a network, by dividing the signal into multiple time slots. Each station, such as anchor stations 302 described herein, may share the frequency being used for pulses by being assigned a specific time slot for transmissions. In one embodiment, the central station 312, having received information from one or more mobile stations 304 regarding its/their position(s), uses the determined positions to adjust time slotting within TDMA. The central station 312 is used in the system 300, and is connected with the mesh 306 to receive information from one or more mobile stations 304. Time slots for anchor stations 302 are assigned by the central station 312. Any appropriate communication technique may be employed including CDMA techniques or other time and/or frequency slotting or sharing techniques.

In one embodiment, location information for one or more mobile stations 304 is used to adjust time slots for the various anchor stations. For example, when a position 310 of a mobile station is closer to some anchor stations 302 than others, the time slots for those anchor stations 302 at a greater distance may be expanded, allowing for pulse propagation and receipt without overlap from other anchor stations 302 due to distance. The central station 312 in one embodiment monitors distances from each line of sight anchor station 302 to each mobile station 304, and adjusts the time slots for the anchor stations according to expected propagation times, to reduce crosstalk between anchor stations 302. Further, pulse coding and different frequencies including spread spectrum techniques may also be used to reduce crosstalk between close anchor stations 302 or other anchor stations.

The anchor system stations 302 are all registered devices on the network 300, so each anchor point 302 is a WirelessHART® device with an RF transmitter 402. In addition, the anchor station 302 contains an ultrasonic transmitter 404 and some glue logic 406.

Figure 4:
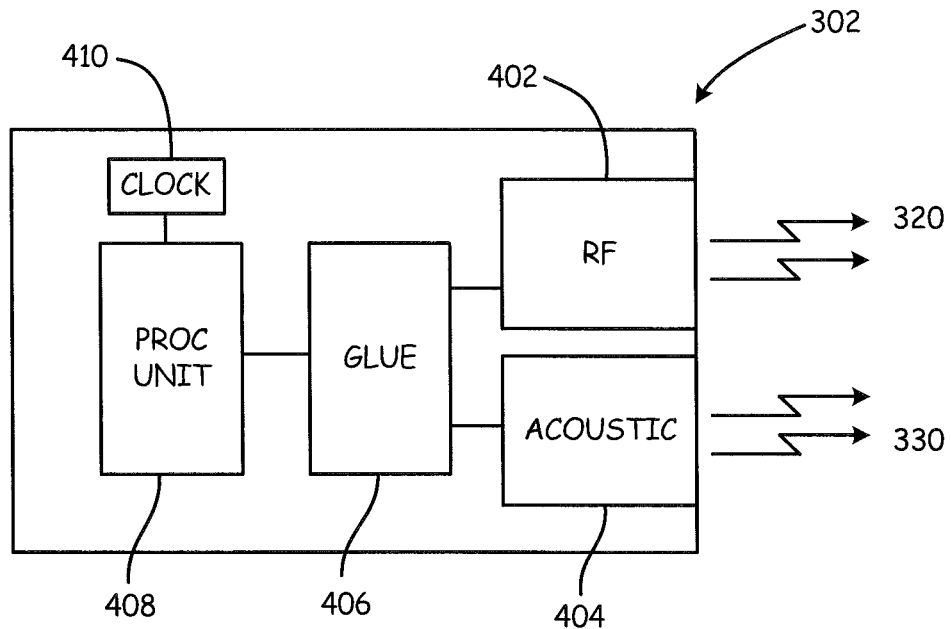
FIG. 4 is a block diagram of an anchor station in accordance with one embodiment of the present disclosure.
Figure 5:
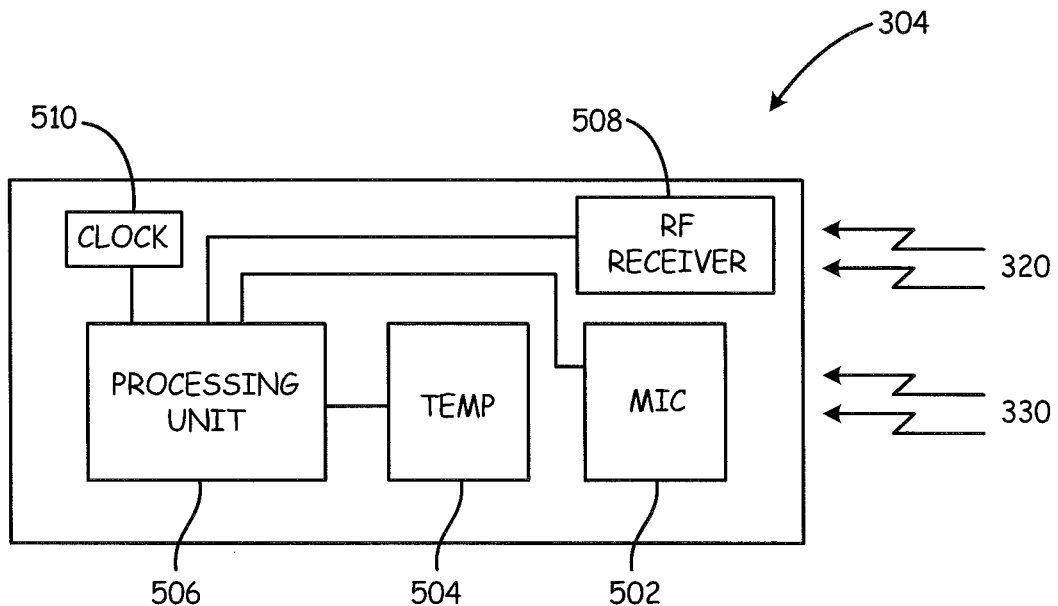
FIG. 5 is a block diagram of a mobile station in accordance with one embodiment of the present disclosure.

Details of an anchor station 302 are shown in FIG. 4. Each anchor station 302 includes in one embodiment an RF transmitter (i.e., WirelessHART®) 402, an acoustic transmitter 404, glue logic 406 to allow interface between various more complex logic circuits such as the RF and acoustic transmitters, a processing unit 408, or the like within the anchor station 302, and a clock 410. In one embodiment, acoustic transmitter 404 is an ultrasonic transmitter. Glue logic 406 is known in the art and will not be described further herein. Also, WirelessHART® is a known standard for wireless sensor networking based on the Highway Addressable Remote Transducer (HART®) Protocol. In one embodiment, the anchor stations 302 are part of a mesh, or network 603, of devices, such that each anchor station 302 is a WirelessHART® device on the wireless mesh network 306. Clock 410 is operatively coupled in one embodiment to processing unit 406 to allow processing unit 406 to determine a time of transmission of signals such as RF signal 320 and acoustic signal 330. In another embodiment, clock 410 may be a part of processing unit 406.

In one configuration, the mobile station 304 is also a WirelessHART® device with an omnidirectional ultrasonic microphone 502, temperature sensor 504, a small processing unit 506, and an RF receiver 508.

The mobile station 304 includes in one embodiment an omnidirectional microphone 502, a temperature sensor 504, a processing unit 506, an RF receiver 508, and a clock 510. Microphone 502 is, in one embodiment, an ultrasonic microphone, and is operatively coupled to the processing unit 506. RF receiver 508 is also operatively coupled to processing unit 506. Temperature sensor 504 is used to detect a temperature at the mobile station 304, and is also operatively coupled to the processing unit 506 to convey temperature information to the processing unit 506. The processing unit 506 uses temperature determined by the temperature sensor 504 to determine the speed of sound, and the receipt times of the pulses are used with the determined speed of sound to determine the distance between the anchor station 302 and the mobile station 304 as further described below. Clock 510 is operatively coupled in one embodiment to processing unit 506 to allow processing unit 506 to determine a time of receipt of signals such as RF signal 320 and acoustic signal 330. In another embodiment, clock 510 may be a part of processing unit 506.

The anchor station 302 transmits an RF (WirelessHART®) message 320 and an Ultrasonic pulse 330 simultaneously. Each anchor station 302 transmits in predefined time slot. The time slot allocation will be done in a way that will prevent ultrasonic cross talk between close anchor stations 302. The anchor station 302 may also use different frequency slots and pulse coding to prevent cross talk between close anchor stations 302.

The mobile device 304 records the reception times of the RF message 320 and the ultrasonic pulse 330. Knowing the speed of sound (determined as described below), the time delay between the receptions of the pulses gives the distance between the mobile device 304 and the anchor station 302.

The omnidirectional microphone 502 on the mobile station 304 receives one or more acoustic pulse signals, indicating a direct path pulse and a multipath pulse or pulses. The RF receiver 508 receives the RF pulse. As the RF signal travels many orders of magnitude faster than the acoustic pulse (on the order of $10^6$ times faster), the RF pulse is received at the mobile station before the acoustic pulse. The RF pulse is used in this embodiment as a synchronization pulse transmitted to synchronize the anchor station and the mobile station. The RF pulse is distinguished from the acoustic pulse by the difference in the time of flight (ToF) for the pulses. The temperature sensor 504 on the mobile station determines the temperature and conveys the temperature to the processing unit 506, which uses known equations to determine the speed of sound at the temperature determined by the temperature sensor 504. One calculation of the speed of sound (c) based on temperature, for relatively dry air at sea level, is:

$$c = 331.5\sqrt{1 + \frac{T}{273}}$$

where c is the speed of sound in meters per second, and T is the temperature in degrees Celsius as measured by the temperature sensor 504. As air is a nearly ideal gas, measurements in air of the speed of sound are nearly entirely dependent on temperature. If even more accurate measurements are desired, in one embodiment, further variables may be measured, for example humidity and density, by various sensors that may also be employed on the mobile station.

When an RF pulse 320 is received at the RF receiver 508 of a mobile station, the time of its receipt is determined. When an acoustic pulse 330 is received at the microphone 502, the time of its receipt is determined. In one embodiment, the time difference between receipt of the RF pulse 320 at the mobile station 304 and receipt of the acoustic pulse 330 at the mobile station 304 is used with the speed of sound determined using the temperature to determine the distance traveled by the acoustic pulse 330. Measurement of distance in one embodiment is a calculation where distance is equal to the speed of sound at the current temperature multiplied by the difference in receipt time between the RF pulse 320 and the acoustic pulse 330.

In order to accurately determine distance, a line of sight between an anchor station 302 and a mobile station 304 is desired. Without a direct line of sight between the anchor station 302 and the mobile station 304, the time of flight will not reflect the actual distance between the anchor station 302 and the mobile station 304, but instead will reflect the time of flight along a non-direct path. So, for proper distance determination, a line of sight between the anchor station 302 and the mobile station 304 is desired.

In order to calculate its positioning, the mobile station 304 measures the distance to at least three anchor stations 302. Three anchor stations 302 allow for adequate determination of position, for example by trilateration, for a mobile station 304 that is in the line of sight of each of the anchor stations 302, but in case there are more anchor points 302 in the area, the redundancy can be used to improve the robustness of the measurement. While three anchor stations 302 (respectively, 302A, 302B, and 302C) are shown in FIG. 3, it should be understood that for complete coverage of an area, additional anchor stations may be used to increase the accuracy of position 310 determination, and to provide more potential line of sight options for all parts of the area to be covered by the system 300. Further, while one mobile station 304 is shown, multiple mobile stations 304 may be disposed within the area to be monitored, and the system 300 may use the same plurality of anchor stations 302 transmitting RF and acoustic signals to determine multiple locations 310 of multiple mobile stations 304. The mobile station 304 reports the acquired information to a central station 312 via the network 306. The central station 312 may run an algorithm that optimizes the TDMA time slots according the current positions 310 of mobile stations 304 and may modify the network parameters accordingly. Within the mesh network, since locations of anchor stations 302 may be transmitted over the network, anchor stations 302, mobile stations 304 or the central station 312 may, in various embodiments, make a determination of the position of a mobile station 304.

In some situations, position of a mobile station may be determined using fewer than three anchor stations. Such a situation includes by way of example, but is not limited to, where there is some external information known about the mobile station, such as that it is located in a corridor or other known confined area, or where other tracking information is known for the mobile station. In such situations, position may be determined using as few as one anchor station.

In operation, the system 300 works as follows. A plurality of anchor stations such as anchor stations 302 are disposed at known positions in an area to be monitored such that all parts of the area have line of sight coverage from at least three anchor stations. Mobile stations such as mobile stations 304 are provided on items or persons that are to have their position monitored and/or determined. Each anchor station transmits RF and acoustic pulses, as described above, in its predetermined time slot of the TDMA time slots assigned in one embodiment by a central station such as central station 312. The mobile stations 304 receive the RF and acoustic pulses as described above, calculate distances from at least three anchor stations as described above, and a central station of the mobile station may determine the position of the mobile station as described above.

Figure 6:
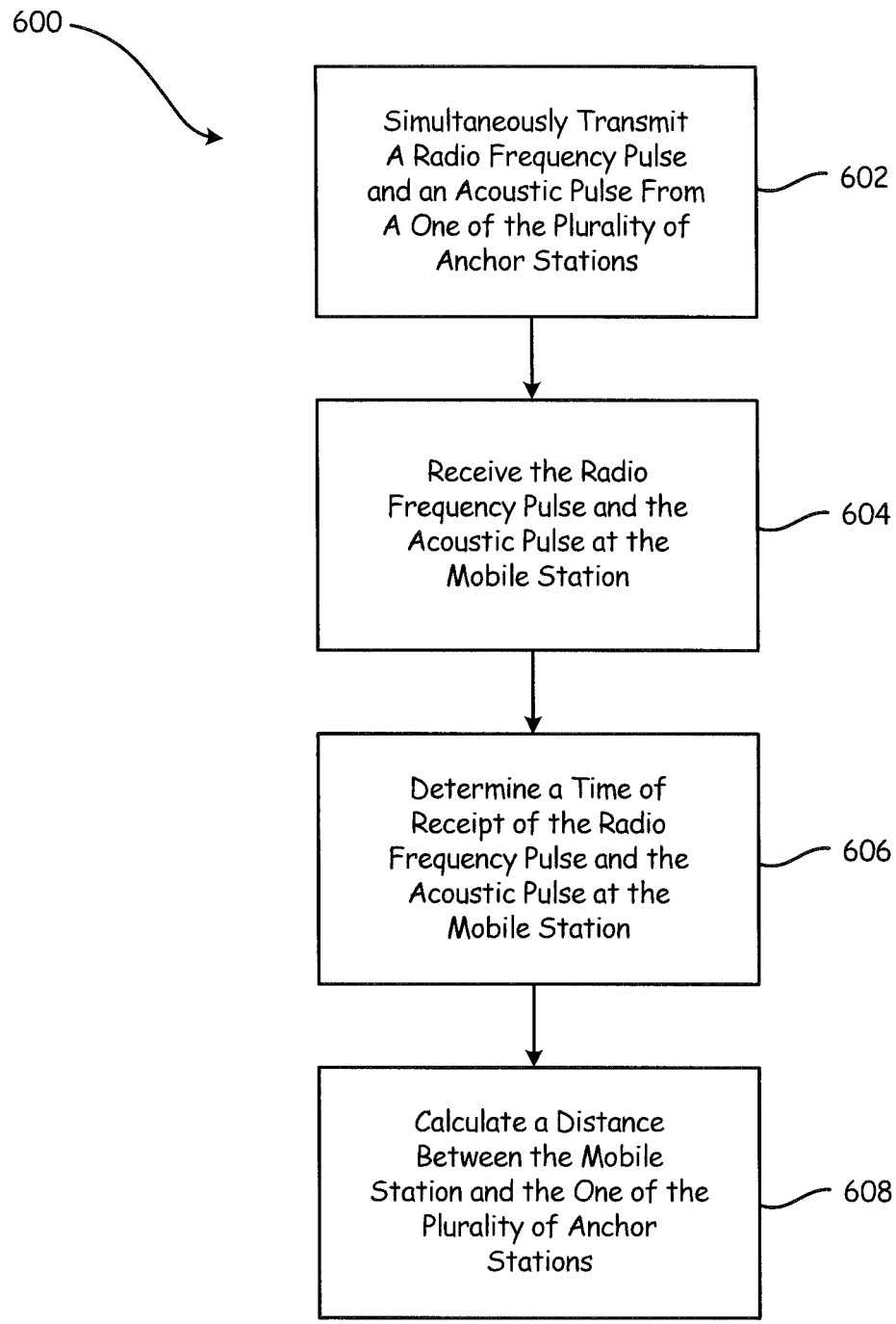
FIG. 6 is a flow chart diagram of a method in accordance with one embodiment of the present disclosure.

An embodiment of a method 600 of determining position of a mobile station with a plurality of anchor stations at known positions is shown in flow chart form in FIG. 6. Method 600 includes in one embodiment simultaneously transmitting a radio frequency pulse and an acoustic pulse from a one of the plurality of anchor stations in block 602, receiving the radio frequency pulse and the acoustic pulse at the mobile station in block 604, determining a time of receipt of the radio frequency pulse and the acoustic pulse at the mobile station in block 606, and calculating a distance between the mobile station and the one of the plurality of anchor stations in block 608. For each of at least three of the plurality of anchor stations, this process may be repeated to determine at least three distances from the mobile station to an anchor station, and the at least three distances may be used to determine a position of the mobile station.

Figure 7:
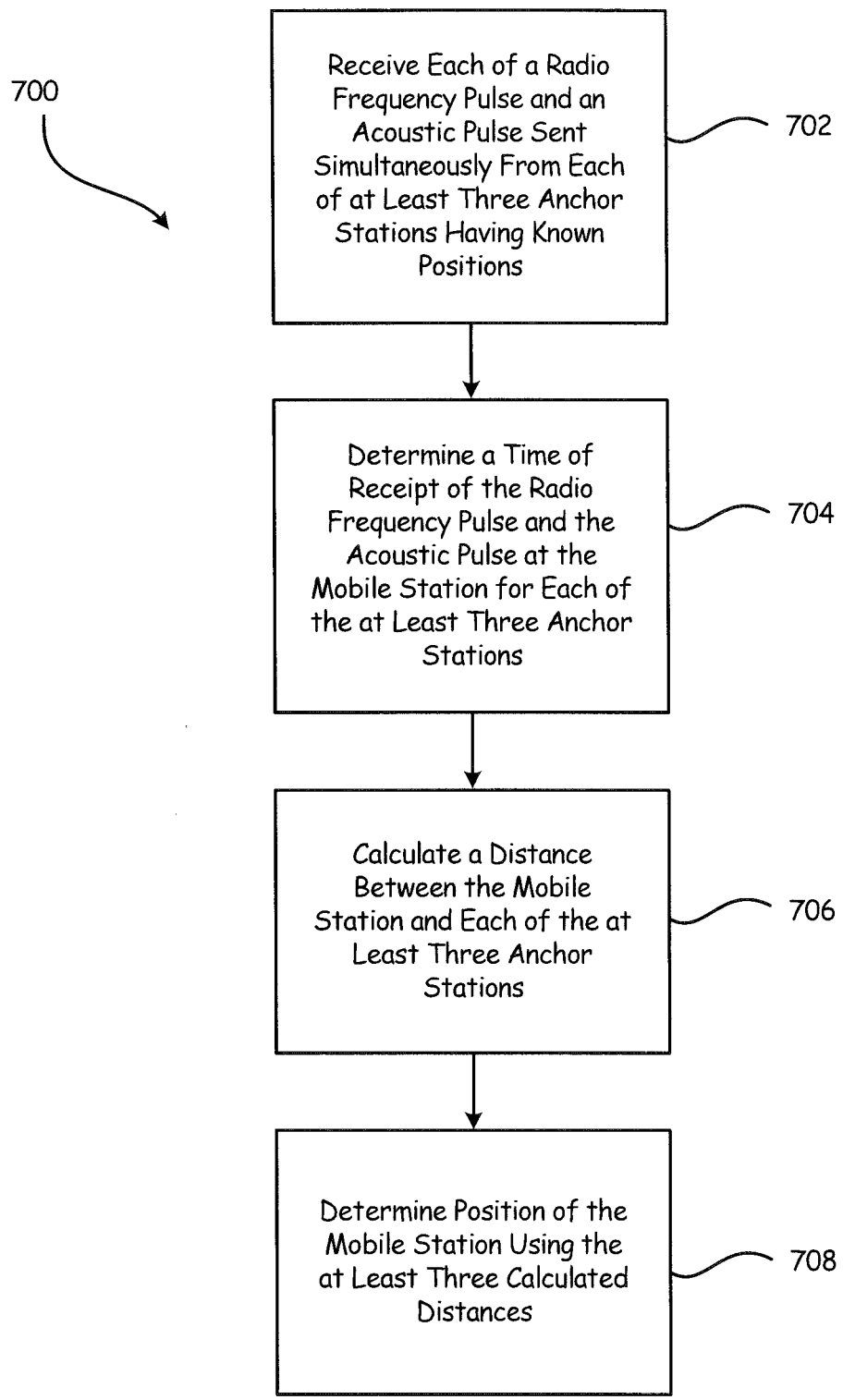
FIG. 7 is a flow chart diagram of a method in accordance with another embodiment of the present disclosure.

Another embodiment of a method 700 of determining position of a mobile station is shown in flow chart form in FIG. 7. Method 700 includes in one embodiment receiving each of a radio frequency pulse and an acoustic pulse sent simultaneously from each of at least three anchor stations having known positions in block 702, determining a time of receipt of the radio frequency pulse and the acoustic pulse at the mobile station for each of the at least three anchor stations in block 704, calculating a distance between the mobile station and each of the at least three anchor stations in block 706, and determining position of the mobile station using the at least three calculated distances in block 708.

In each of the methods 600 and 700, calculating the distance between the mobile station and the transmitting anchor station includes in one embodiment determining a speed of sound at the mobile station, and multiplying the speed of sound at the mobile station with the time difference between receipt of the radio frequency pulse and the acoustic pulse at the mobile station. Determining the speed of sound at the mobile station includes in one embodiment determining a temperature at the mobile station, and calculating the speed of sound based on the temperature. Determining a location of the mobile station includes in one embodiment locating by trilateration the mobile station using the at least three calculated distances and the known positions of the at least three anchor stations.

Various aspects include:
Indoor positioning system that combines both Ultrasonic and RF signals
Usage of RF signal to synchronize the ToF measurement of an Ultrasonic pulse
Positioning system where the Anchor stations devices are cross connected via a wireless mesh network
Positioning system where the mobile device is connected to the anchor station via a wireless mesh network
Positioning system where a central station may run an algorithm that optimizes the TDMA time slots according to the current positions of mobile devices and may modify the network parameters accordingly.

Although the present invention has been described with reference to preferred embodiments, workers skilled in the art will recognize that changes may be made in form and detail without departing from the spirit and scope of the invention. Although, in general, an indoor positioning system has been described, the present invention can also be used in outdoor environments. Communication can be in accordance with any standard and is not limited to a mesh network type communication system. As used herein, the term "acoustic" includes acoustic signals at any frequency including ultrasonic. Similarly, the term "RF" refers to radio frequency of any appropriate wavelength. As used herein, the term "anchor" refers to a base transmitter whose location is known and is used as a reference location in determining location. The term "mobile device" refers to the device, such as a mobile station, whose location is being identified. Although a microphone is illustrated herein, any type of acoustic receiver may be implemented. The acoustic receiver may be omnidirectional or may be directional in nature. If a directional acoustic receiver is used, information related to a direction of a received acoustic signal may be used in the position determination. Further, a mobile station may include more than one acoustic receiver. If multiple acoustic receivers are implemented on a single mobile station, they may be used, in some configurations, to provide location information. For example, two directional acoustic receivers may provide information related to the direction from which an acoustic signal is received. The acoustic signal can comprise a continuous signal with some type of timing information included such as an amplitude or frequency pulse or change, digital information, etc. The acoustic signal may be sent on more than one frequency as desired. The processing unit which is used to determine location may reside in the mobile station, in one or more of the anchor stations, at a central station, or at some other location.

What is claimed is:

1. An indoor position system, comprising:
    a plurality of anchor stations, each configured to simultaneously transmit a radio frequency signal and an acoustic signal during a time slot reserved for each of the plurality of anchor stations;
    a mobile station including:
        a radio frequency receiver configured to receive the radio frequency signal from at least one of the plurality of anchor stations;
        an acoustic receiver configured to receive the acoustic signal from at least one of the plurality of anchor stations; and
        a processing unit configured to determine position information of the mobile unit based upon the received radio frequency signal and the received acoustic signal.

2. The indoor position system of claim 1, wherein each of the plurality of anchor stations comprises:
    an RF transmitter;
    an acoustic transmitter;
    an anchor station processing unit; and
    glue logic coupled to the RF transmitter, the acoustic transmitter, and the processing unit to allow interface therebetween.

3. The indoor positioning system of claim 2, wherein the acoustic transmitter is an ultrasonic transmitter.

4. The indoor positioning system of claim 2, wherein the RF transmitter is a wireless mesh transmitter.

5. The indoor positioning system of claim 1, wherein the mobile station includes a temperature sensor.

6. The indoor positioning system of claim 1, wherein the acoustic receiver comprises a microphone.

7. The indoor positioning system of claim 1, and further comprising:
    a central station separate from the plurality of anchor stations and configured to communicate with the plurality of anchor stations.

8. The indoor positioning system of claim 7, wherein the central station further comprises a central station processing unit configured to assign time division multiple access time slots for transmissions by the plurality of anchor stations, each time division multiple access time slot reserved for transmission of a single radio frequency signal and a single acoustic signal from a single anchor station.

9. The indoor positioning system of claim 8, wherein the central station processing unit is further configured to modify parameters of a mesh network based on a determined location of the mobile station.

10. The indoor positioning system of claim 1, wherein each radio frequency signal and acoustic signal from a respective anchor station are transmitted from the respective anchor station synchronized within a determined time slot, and wherein the mobile station is configured to receive the transmitted radio frequency signal and acoustic signal from at least three of the plurality of anchor stations, each anchor station radio frequency signal and acoustic signal within its own synchronized determined time slot, and calculate a position of the mobile station based on the received signals and known positions of the at least three of the plurality of anchor stations.

11. The indoor positioning system of claim 1, wherein, each radio frequency signal and acoustic signal from a respective anchor station are transmitted from the respective anchor station synchronized within a determined time slot, wherein the mobile station is in a partially known position, and wherein the mobile station is configured to receive the transmitted radio frequency signal and acoustic signal from at least one of the plurality of anchor stations, each anchor station radio frequency signal and acoustic signal within its own synchronized determined time slot, and calculate a position of the mobile station based on the received signals and known positions of the at least one of the plurality of anchor stations and the partially known position.

12. The indoor positioning system of claim 1, and further comprising a plurality of mobile stations, each mobile station configured to receive the simultaneously transmitted radio frequency signal and acoustic signal of at least one of the plurality of anchor stations.

13. The indoor positioning system of claim 1 wherein the processing unit is located in one of the plurality of anchor stations.

14. The indoor positioning system of claim 1 wherein the processing unit is located in the mobile station.

15. The indoor positioning system of claim 1 wherein the processing unit is located in a central station.

16. A method of determining position using the indoor positioning system of claim 1, comprising:
   simultaneously transmitting the radio frequency signal and the acoustic signal from one of the plurality of anchor stations;
   receiving the radio frequency signal and the acoustic signal at the mobile station;
   determining a time of receipt of the radio frequency signal and the acoustic signal at the mobile station; and
   calculating a distance between the mobile station and the one of the plurality of anchor stations.

17. The method of claim 16, wherein calculating the distance between the mobile station and the transmitting anchor station comprises:
   determining a speed of sound at the mobile station; and
   multiplying the speed of sound at the mobile station with the time difference between receipt of the radio frequency signal and the acoustic signal at the mobile station.

18. The method of claim 17, wherein determining the speed of sound at the mobile station comprises determining a temperature of air, and calculating the speed of sound based on the temperature.

19. The method of claim 16, and further comprising:
   repeating simultaneously transmitting, receiving, determining, and calculating for one radio frequency signal and one acoustic signal of each of at least two additional anchor stations of the plurality of anchor stations; and
   determining a location of the mobile station based on the calculated distances.

20. The method of claim 16, wherein determining a location of the mobile station comprises:
   locating by trilateration the mobile station using the at least three calculated distances and the known positions of the at least three anchor stations.

21. A method of determining position using the indoor positioning system of claim 1, comprising:
   receiving within its own synchronized determined time slot each of the radio frequency signal and the acoustic signal sent simultaneously from each of at least three anchor stations having known positions;
   determining a time of receipt of the radio frequency signal and the acoustic signal at the mobile station for each of the at least three anchor stations;
   calculating a distance between the mobile station and each of the at least three anchor stations; and
   determining position of the mobile station using the at least three calculated distances.

22. The method of claim 18, wherein calculating the distance between the mobile station and the transmitting anchor station comprises:
   determining a speed of sound at the mobile station; and
   multiplying the speed of sound at the mobile station with the time difference between receipt of the radio frequency signal and the acoustic signal at the mobile station.

23. The method of claim 19, wherein determining the speed of sound at the mobile station comprises determining a temperature of air, and calculating the speed of sound based on the temperature.

24. The method of claim 18, wherein determining a location of the mobile station comprises: locating by trilateration the mobile station using the at least three calculated distances and the known positions of the at least three anchor stations.

* * * * *